(12) United States Patent
De Campos et al.

(10) Patent No.: US 8,607,420 B2
(45) Date of Patent: Dec. 17, 2013

(54) HOSE CLAMP

(75) Inventors: Marco Antonio Vieira De Campos, Jd Joseli-Iperó (BR); Reiner Lubowietzki, De Lorenzzi-Boituva (BR); Leticia Pantojo, Jardim Irene-Iperió (BR); Wellington Fernando Domingues, Nova Tatui-Tatui (BR); Lilian Aires Muzel, Jardim Sartorelli-Iperó (BR); José Silva Muniz, Jardin Irene-Iperó (BR); Rodrigo Garcia Jaques Eid, Jardim Irene-Iperó (BR); Alberto Caetano Dos Santos, Vila Brasil-Tatui (BR); Jose Antonio Fernandes Junior, Centro-Boituva (BR)

(73) Assignee: Progeral Industria de Artefatos Plasticos Ltda., Ipero-SP CEP (BR)

( * ) Notice: Subject to any disclaimer, the term of this patent is extended or adjusted under 35 U.S.C. 154(b) by 0 days.

(21) Appl. No.: 12/678,607

(22) PCT Filed: Oct. 31, 2008

(86) PCT No.: PCT/IB2008/003763
§ 371 (c)(1),
(2), (4) Date: Jun. 30, 2010

(87) PCT Pub. No.: WO2009/060313
PCT Pub. Date: May 14, 2009

(65) Prior Publication Data
US 2010/0281655 A1    Nov. 11, 2010

(30) Foreign Application Priority Data

Nov. 9, 2007   (EP) ..................................... 07021839
Nov. 13, 2007  (EP) ..................................... 07021980

(51) Int. Cl.
*F16L 33/02*        (2006.01)

(52) U.S. Cl.
USPC ............ 24/274 R; 24/19; 24/20 CW; 24/20 R

(58) Field of Classification Search
USPC ............................. 24/19, 20 CW, 20 R, 274 R
See application file for complete search history.

(56) References Cited

U.S. PATENT DOCUMENTS

| 4,308,648  | A  | * | 1/1982 | Fay .............................. 24/274 R |
| 4,315,348  | A  | * | 2/1982 | Oetiker ..................... 24/20 CW |
| 5,115,541  | A  | * | 5/1992 | Stichel ........................ 24/20 R |
| 5,309,607  | A  | * | 5/1994 | Hohmann et al. .......... 24/274 R |
| 7,389,568  | B2 | * | 6/2008 | Crockett et al. ............ 24/274 R |
| 2003/0159255 | A1 | * | 8/2003 | Senovich et al. ............. 24/20 R |
| 2005/0087979 | A1 |   | 4/2005 | Col ................................. 285/23 |
| 2007/0022578 | A1 | * | 2/2007 | Crockett et al. ............ 24/274 R |
| 2008/0098572 | A1 | * | 5/2008 | Krauss ............................. 24/19 |

* cited by examiner

*Primary Examiner* — Robert J Sandy
*Assistant Examiner* — David Upchurch
(74) *Attorney, Agent, or Firm* — Andrew Wilford

(57) ABSTRACT

A hose clamp has a flexible strap fittable around a hose and having opposite ends, a strap end part separate from the strap, and a mechanism for increasing or reducing the effective length of the strap. This mechanism is between one of the ends of the strap and the strap end part. A spring element separate from the strap and strap end part has one end linked to the strap and another end linked to the strap end part so as to provide a spring force in the circumferential direction of the strap.

12 Claims, 9 Drawing Sheets

HOSE CLAMP

CROSS REFERENCE TO RELATED APPLICATIONS

This application is the US-national stage of PCT application PCT/IB2008/003763, filed 31 Oct. 2008, published 14 May 2009 as WO2009/060313, and claiming the priority of European patent application 07021839.1 itself filed 9 Nov. 2007 and European patent application 07021980.3 itself filed 13 Nov. 2007, whose entire disclosures are herewith incorporated by reference.

FIELD OF THE INVENTION

The invention relates to a hose clamp or a hose clip comprising a flexible strap to be placed around a hose which is elongated or shortened by a mechanism for increasing or reducing the effective length of the strap, the mechanism being fixed to one end of the strap and driving the other end of the strap.

BACKGROUND OF THE INVENTION

Such hose clamps are well known and normally used to fix a hose made of plastic or rubber materials to another part, such as tubes, pipes, nipples made from plastic or metallic materials. The mechanism for increasing or reducing the effective length of the strap may typically comprise a housing with a drivable bolt or screw having an exterior thread. This housing is fixed to one end of the strap.

The place where the clamp will be assembled over is comprehended by the hose assembled over the tube, pipe or nipple. This assembly will be from now on called set.

The other end of the strap is overlying the foresaid fixed end and guided through said housing having engagement means provided in this end of the strap for engaging and is driven by the thread of the bolt or screw. For example, these engagement means may be provided by a threaded area, by teeth or several successive openings in the strap.

When rotating the bolt or screw over the set, the effective length of the strap and thus the inner free diameter of clamp may be increased or reduced depending on the direction of rotation. Having that the hose is made of elastomeric material (rubber or plastic or the like), it can be assembled to another part (i.e. tube, pipe or nipple) and fixed by means of a hose clamp surrounding the hose.

The mechanism described above will not limit the invention and only serves as an example. It is well know to the person skilled in the art to provide other mechanisms for tightening or tensioning hose clamps.

As a problem it is well known that the elastomeric material of a hose may deteriorate by aging. For example it may shrink which may cause failure of the hose connection. To reduce this risk it is known in the art to provide a spring action within a hose clamp for compensation.

For example U.S. Pat. No. 5,309,607 and U.S. Pat. No. 5,115,541 disclose a spring element mounted in the interior of such a well known hose clamp on the inner side of the unitarily formed strap. This spring element exerts a spring force in a radial direction to a hose surrounded by such a hose clamp. The disadvantage of such a spring element in the interior of the hose clamp is that the inner free diameter is artificially reduced and the cross section of the hose clamp is no more circular. Accordingly a specific area of a clamped hose which is facing the inserted spring element is more stressed than other areas of the hose leading to the problem that the elastomeric material in this area will receive a higher force and will tend to flow away which may also cause failure of the hose connection.

OBJECT OF THE INVENTION

It is an object of the invention to provide a new hose clamp having a biasing or compensating spring force action on the surrounded hose without having the above-mentioned disadvantage of locally increasing clamping forces.

SUMMARY OF THE INVENTION

This object is attained by a hose clamp of the standard kind, but in which at least one part/area of the strap is formed as a spring element. Such a spring element may be arranged between the fixed end and the driven end of the strap anywhere within the strap but preferably near the mechanism for tightening the strap.

In contrast to the state of the art it is an essential feature of this invention to provide a spring force action within the strap that will be placed around a hose and not as a separate spring element which is located in the inner free diameter of the hose clamp. According to a preferred embodiment the inner diameter of the inventive clamp will not be reduced by the spring element. It is another advantage of this embodiment that the biasing/compensating force provided by this spring element within the strap is not locally acting in a radial direction but is acting lengthwise (in the longitudinal direction of the strap), in more detail in the circumferential direction of the elongated strap. Accordingly, this force will tend to tighten the hose clamp by reducing the inner diameter thus exerting an evenly distributed radial force to the hose.

It is still another advantage of the invention that the maximum force exerted on a hose may be limited due to the fact that when trying to further reduce the diameter of the clamp no reduction will take place but only the spring element will elongate to compensate this force. Furthermore it is an advantage of the invention that the spring element will compensate for changes in the length of the strap due to environmental temperature fluctuations.

In a possible embodiment of the invention the spring element may be unitarily formed with the strap, i.e. the spring element is one piece with the strap. In another preferred embodiment the spring element may be formed in one piece (unitarily) with one of the ends/parts of the strap and may be linked to the other part/end of the strap. In another preferred embodiment the spring element may be formed as a separate element being inserted into the strap between the fixed end and the is driven end of the strap.

Providing a separate spring element within the strap has the advantage of freely choosing the material of the strap and the spring element. Accordingly the spring element and the rest of the strap may be made of the same or of different materials, in particular the material of the spring element being adapted to provide the necessary spring action. As a non-limiting example the spring element may be made of stainless steel or of carbon steel or of spring steel.

Such a spring element provides a compensating mechanism which is positioned uniting both sides/part of the strap. It may be driven by a support (longitudinal spring bridge) in a specific preferred embodiment described later. This compensating mechanism will allow the hose clamp to vary its length at given situations for example due to application environment variations intending to keep enough force over the hose, without damage the hose.

The compensating mechanism of the spring element preferably does not vary its length due to the screw tightening of relieving the screw or bolt, once it is assembled, the proper environment variations will impel the part to vary its diameter in order to supply force enough to make the system (hose+set) keep on working exactly the same way before the given variation. For example, if the temperature of the set comes down, because of a certain environment variation, the hose will contract and as a consequence diminish its diameter. The part will automatically compensate this variation supplying extra force over the hose, through the potential energy stored on the mechanism longitudinal spring element, in particular wavy spring element.

To provide a hose clamp with a separate spring element this spring element may be inserted into the strap by means of a positive locking or form-closed link, in particular by means of at least one linking portion/element on an end of the spring element being linked to a corresponding linking portion/element on an end of the strap. Of course both ends of the spring element may be linked to the corresponding strap ends in the same manner.

As an example an end of the spring element may have at least one bent or T-shaped lug or splice for being inserted into a corresponding number of mating openings at the corresponding end/part of the strap. Such a link may also provide a hinge. In an improved embodiment of such a link connection the linking end part of the strap may be bent up. This provides the possibility to link the spring element to this bent-up part in particular into an opening within this bent-up part in particular without overlay of the spring element and the strap. Furthermore a bent-up part may be bent down again for linking the spring element into this bent-down part in particular into an opening within this bent-down part in particular having the same advantage.

In an alternative embodiment the separate spring element may also be inserted into the strap by means of welding or glueing/bonding at least one end of the spring element to an end of the strap. Of course these and other kinds of linking may be combined.

If the sprint element is unitarily formed with one part of the strap it may be linked to the other part of the strap as mentioned above.

For providing the necessary spring action the spring element (no matter whether unitarily formed or as a separate part) may be formed as a corrugated/undulated/wavy, in particular at least partially flexible element in particular being curved in accordance with the curvature of the strap and having its corrugations/undulations/waves along the lengthwise extension of the strap. Such a spring element may look like a wave propagating along the strap in the direction of the strap i.e. in the circumferential direction.

To assure not to reduce the inner diameter with such a corrugated spring element in a possible improvement the corrugations/undulations/waves of the spring element may be positioned on the outside of an ideal curved line representing the curvature or circumference of the strap.

Preferably at least one or two corrugations/undulations/waves are provided in the spring element but the number is not limited and may be higher. Furthermore the height/amplitude of the corrugations/undulations of the spring element may decrease from the middle of the spring element to the end of the spring element or may be constant.

In another embodiment/improvement the spring element may slidingly guided in a guiding element underlying the spring element from the interior of the hose clamp. Such an embodiment has the advantage to contact the hose in the region of the spring element not only in the apex areas of the corrugations/undulations/waves but evenly on a greater area provided by the guiding element that is positioned between the spring element and the hose. In this embodiment the guiding element may also have a curvature corresponding to the curvature/circumference of the strap and/or spring element. Accordingly the inner diameter of such an inventive hose clamp is identical to the common hose clamp known in the art and not is providing any biasing force.

Furthermore the guiding element may be affixed to one end of the strap and may be slidingly linked to the other end of the strap. Accordingly when tightening the clamp or reducing the effective length of the strap one end of the guiding element may slide along the end of the strip where it is slidingly linked and thus avoiding any kind of limits to the spring element.

The guiding element may additionally be U-shaped in its cross section perpendicular to the lengthwise/circumferential extension of the strap for receiving the spring element in the interior of this cross section. In this embodiment the spring element and the guiding element cannot come out of contact.

Furthermore an auxiliary, for example limiting element may be provided on the hose clamp, in particular for facilitating the prepositioning of the hose clamp on a hose when it is not yet tightened or for other purposes. This auxiliary element may extend at least partly in a direction perpendicular to the strap and in a longitudinal extension of the hose. It may be arranged on the guiding element, for example it may be formed in one piece with the guiding element. In another embodiment it may be welded or bonded/glued to the guiding element in particular if it is made of another material than the guiding element.

When acting as a limiter the auxiliary/limiting element may have a stopping face for contacting the front face of the hose and thus defining the distance between the clamp and the front face. This helps to find and maintain the correct position of the hose clamp prior to tightening of the clamp.

BRIEF DESCRIPTION OF THE DRAWING

Different embodiments of the hose clamp having different types of linking the spring to the strap are described in the figures. The figures show:

FIG. 2B: An assembled hose clamp according to FIG. 2A;

FIG. 5B: An assembled hose clamp according to FIG. 5A.

DETAILED DESCRIPTION

Figure 1A:
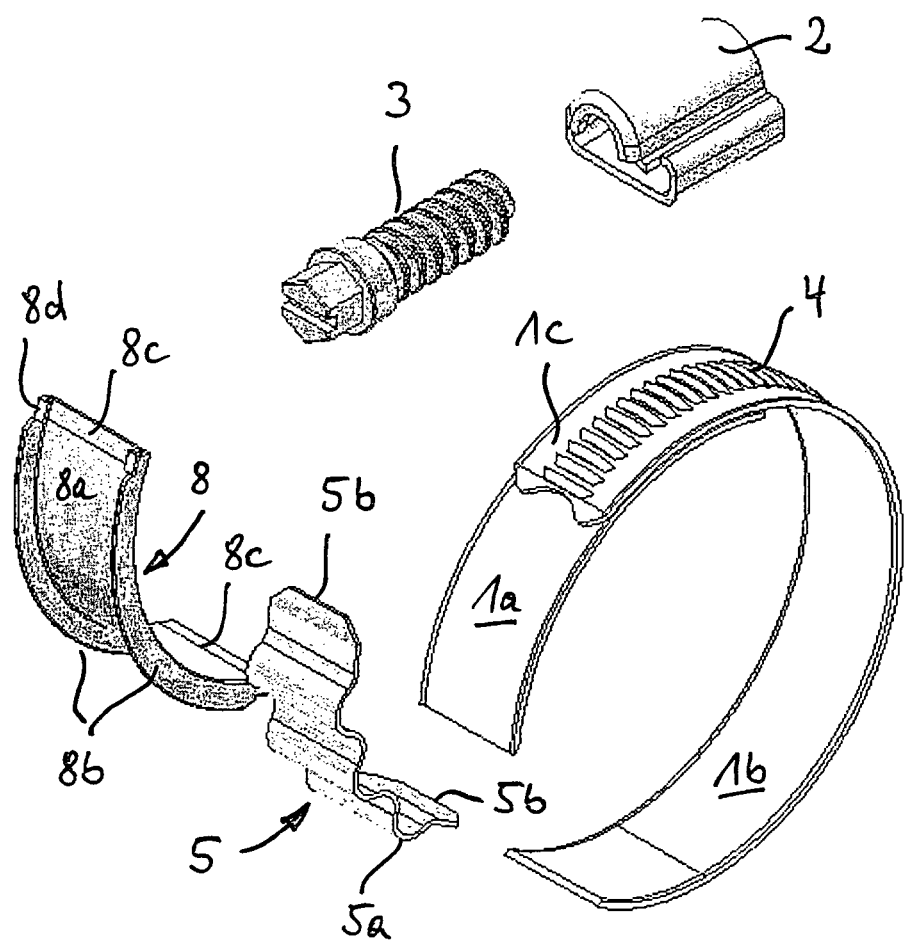
FIG. 1A: An exploded view of a hose clamp, the spring being linked to the strap by welding/glueing.
Figure 1B:
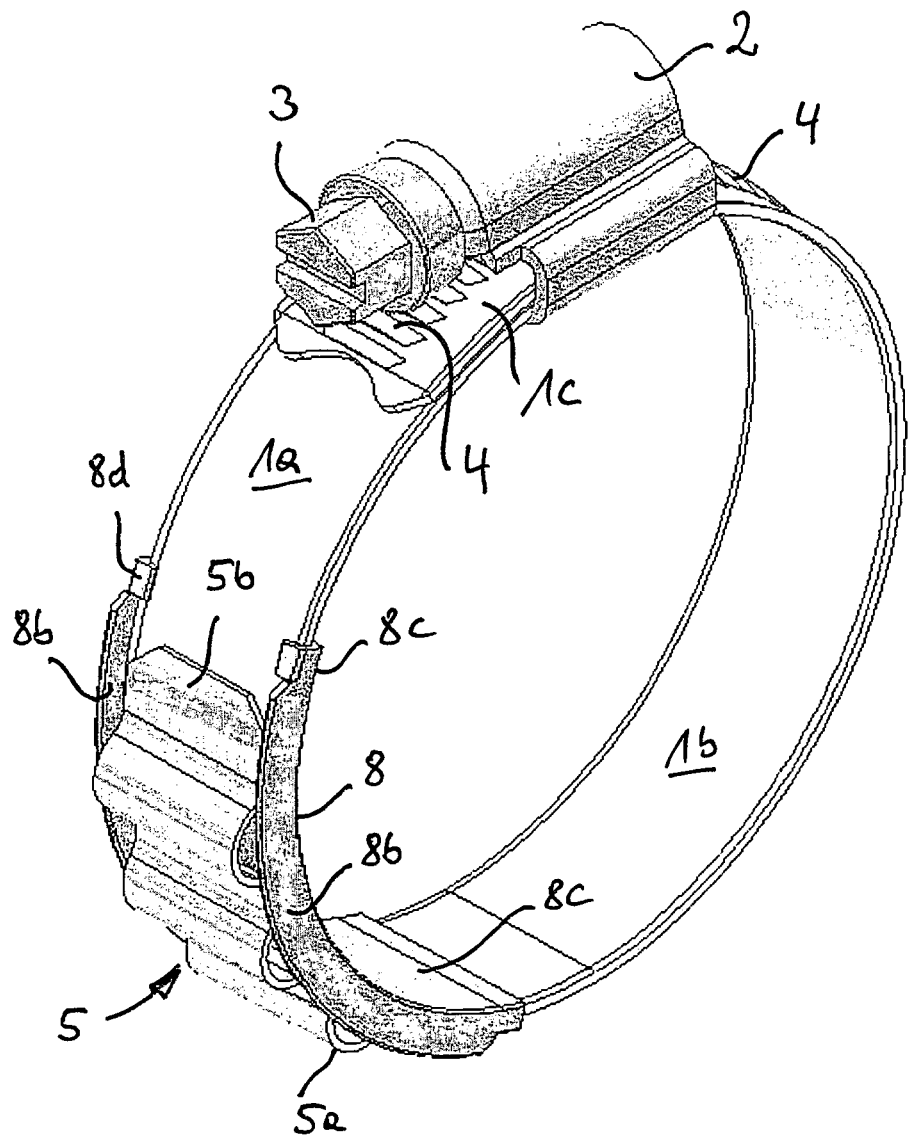
FIG. 1B: An assembled hose clamp according to FIG. 1A.

The embodiments of the hose clamp shown in FIGS. 1-5 all comprise the same elements having identical reference numbers. The hose clamps only differ with respect to the different types of linking of the spring element to the strap. Furthermore FIGS. 5A and 5B show an auxiliary element. These embodiments only serve as an example and will not limit the scope of the patent.

In the exploded views of FIGS. 1A, 2A, 3A and 5A the drawing shows hose clamps having a separate spring element 5 to be inserted into the strap 1 or a gap in the strap 1 along its circumference.

In common the hose clamps of all figures comprise a strap 1 having two ends or parts 1a and 1b. A housing 2 is affixed to the part 1a of the strap, for example by clamping or welding or the like. The open end 1c of the end/part 1b of the strap 1 is overlaying part 1a, guided through the housing 2 and is driven by a drivable screw 3 positioned in the housing 2. The screw 3 has a thread engaging a corresponding engaging area 4 of the open end 1c of the part 1b of the strap 1. This engaging area may be formed as a threaded area 4 or an area 4 having teeth or a row of successive recesses/openings. By turning the screw 3 in the housing 2 the open end 1c will be drawn into the housing 2 or pushed out of the housing and thus will change the diameter of the hose clamp.

As can bee seen in the exploded views of FIGS. 1A, 2A, 3A1 4 and 5A a spring element 5 is provided of form a link between the part 1a and 1b of the strap 1. In all the embodiments this spring element 5 has corrugations/undulations/waves formed as three waves 5a along the length of the spring element 5 and circumferential extension of the strap 1. The number of waves 5a in the spring element 5 shown in the figures will not limit the scope of the invention. The number of waves 5a may be different in other embodiments and may be at least one. Furthermore this spring element 5 has an overall curvature corresponding essentially to the curvature/circumference of the strap 1.

The two ends 5b of the spring element 5 are linked to the strap parts 1a and 1b in different ways. In the FIG. 1 the ends 5b are plane/flat lugs being glued or welded to the surface of the ends of strap parts 1a and 1b.

In the FIGS. 2 and 5 the ends 5b are T-shaped lugs 6, each engaging a mating opening or recess 7 positioned at the end of strap parts 1a and 1b. In the FIG. 3 the ends 5b are bent lugs 6 forming hooks, each engaging a mating opening or recess 7 positioned at the end of strap parts 1a and 1b. In the FIG. 4 the spring element 5 is formed in one piece with the strap 1.

In all the embodiments shown in the drawing furthermore a guiding element 8 is provided, underlying the spring element 5 from the interior of the hose clamp. The guiding element 8 provides a base surface 8a in sliding contact with the spring element 5, the base surface 8a furthermore having side walls 8b and thus a U-shaped cross section perpendicular to the angular extension of the strap 1. According to this shape the spring element 5 cannot come out of contact with the guiding element. Furthermore the overall curvature of the guiding element 8 essentially corresponds to the curvature of the strap 1. The rear surface opposite to surface 8a of the guiding element 8 furthermore contacts the hose (not shown) and protects the hose to be clamped against the spring element 5 and its corrugations/undulations or waves 5a.

One of the ends 8c of the guiding element 8 is affixed to the strap 1, the other end 8c of the guiding element may slide on the end of the strap 1. To provide the possibility of sliding along the strap 1 the end 8c of the guiding element 8 may have bent lugs 8d engaging loosely around the strap 1, in particular part 1a or 1b of the strap 1. The fixed end 8c may have the same lugs 8d but bent tight around the strap 1, in particular part 1b or 1a of the strap 1. The lugs 8d may be end parts of the side walls 8b.

Figure 2A:
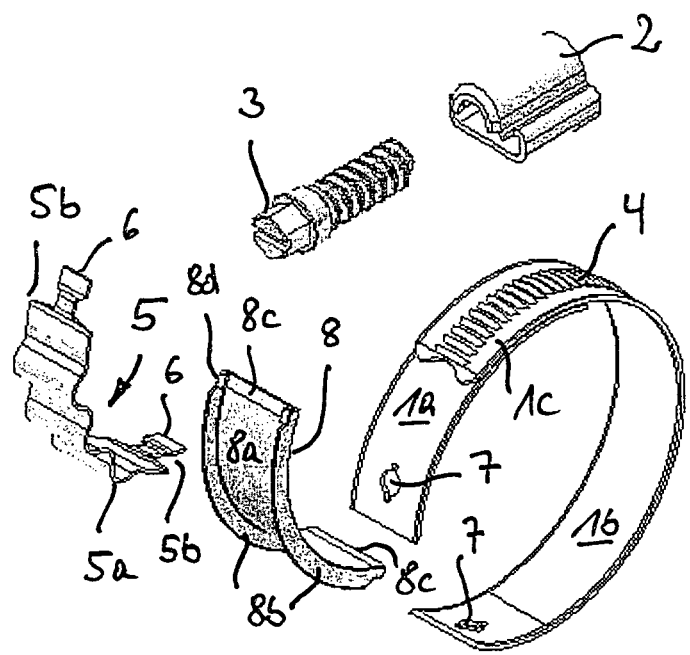
FIG. 2A: An exploded view of a hose clamp, the spring being linked to the strap by a T-shaped lug to be inserted into a corresponding opening in the strap.
Figure 23:
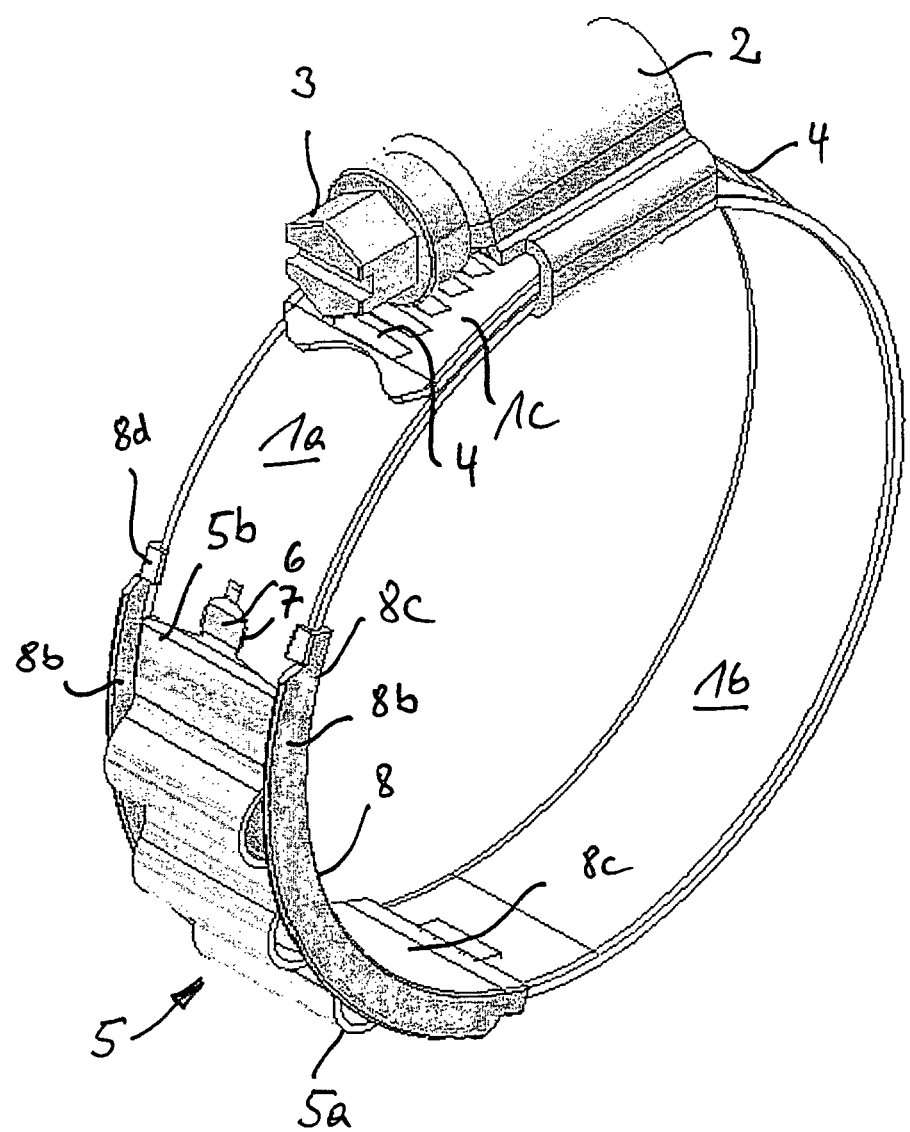
Figure 3A:
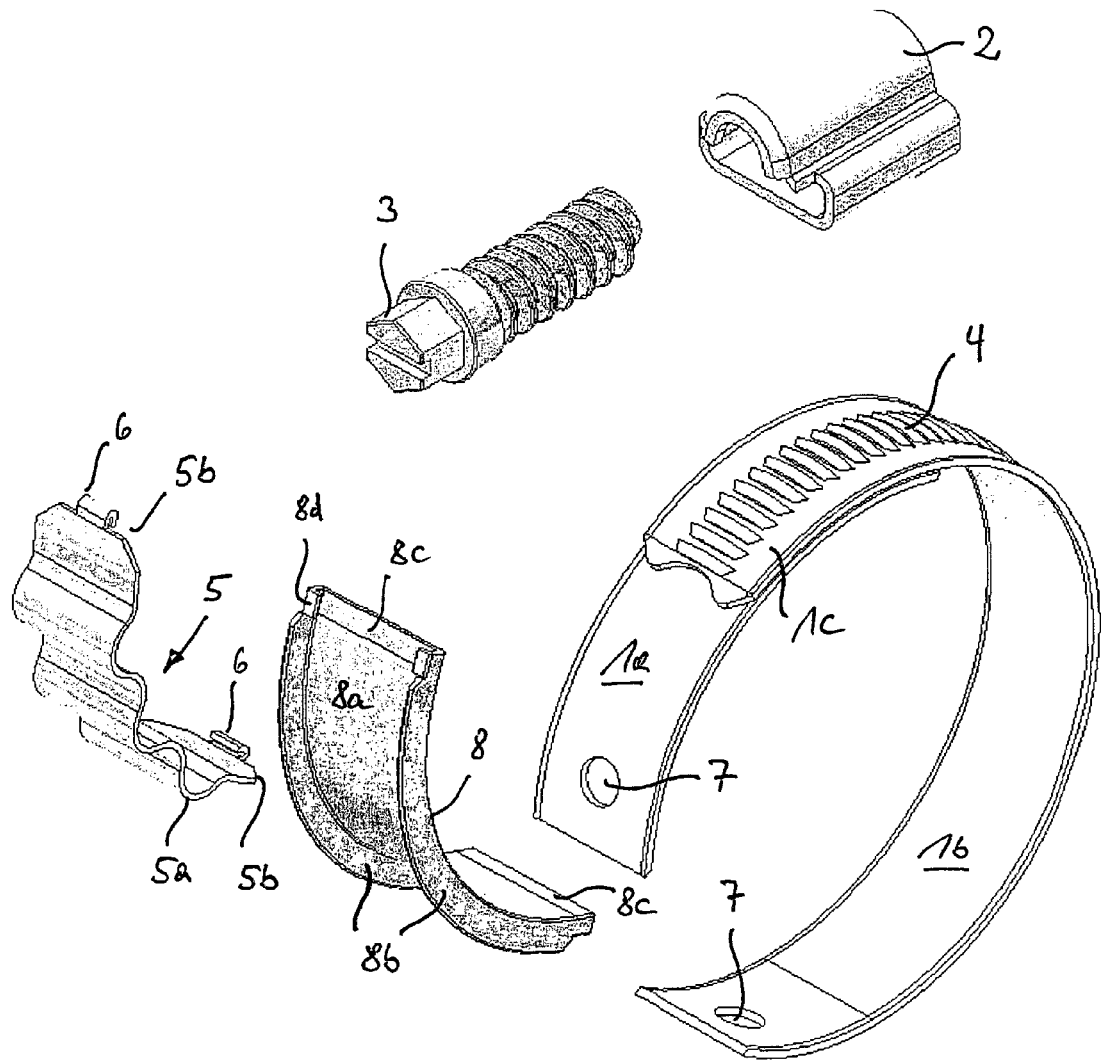
FIG. 3A: An exploded view of a hose clamp, the spring being linked to the strap by a bent lug to be inserted into a corresponding opening in the strap.
Figure 3B:
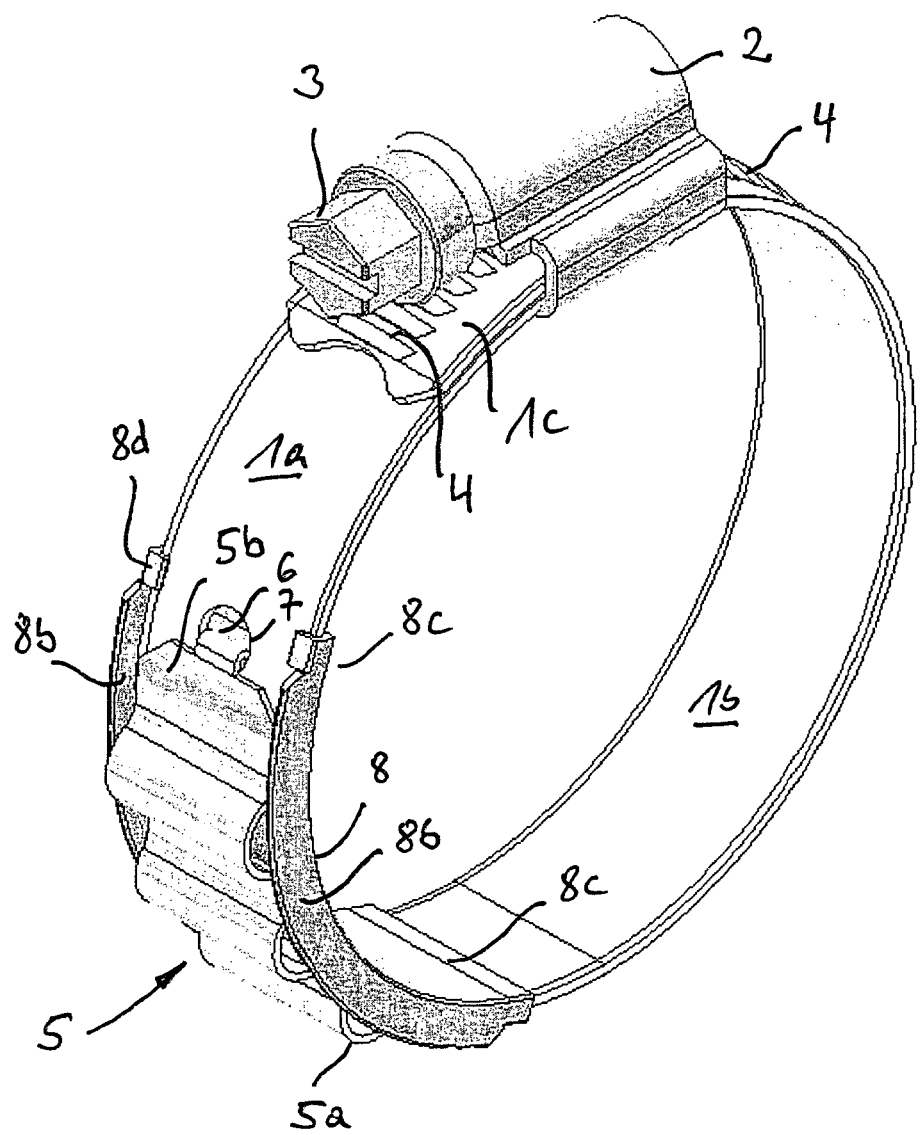
FIG. 3B: An assembled hose clamp according to FIG. 3A.
Figure 4:
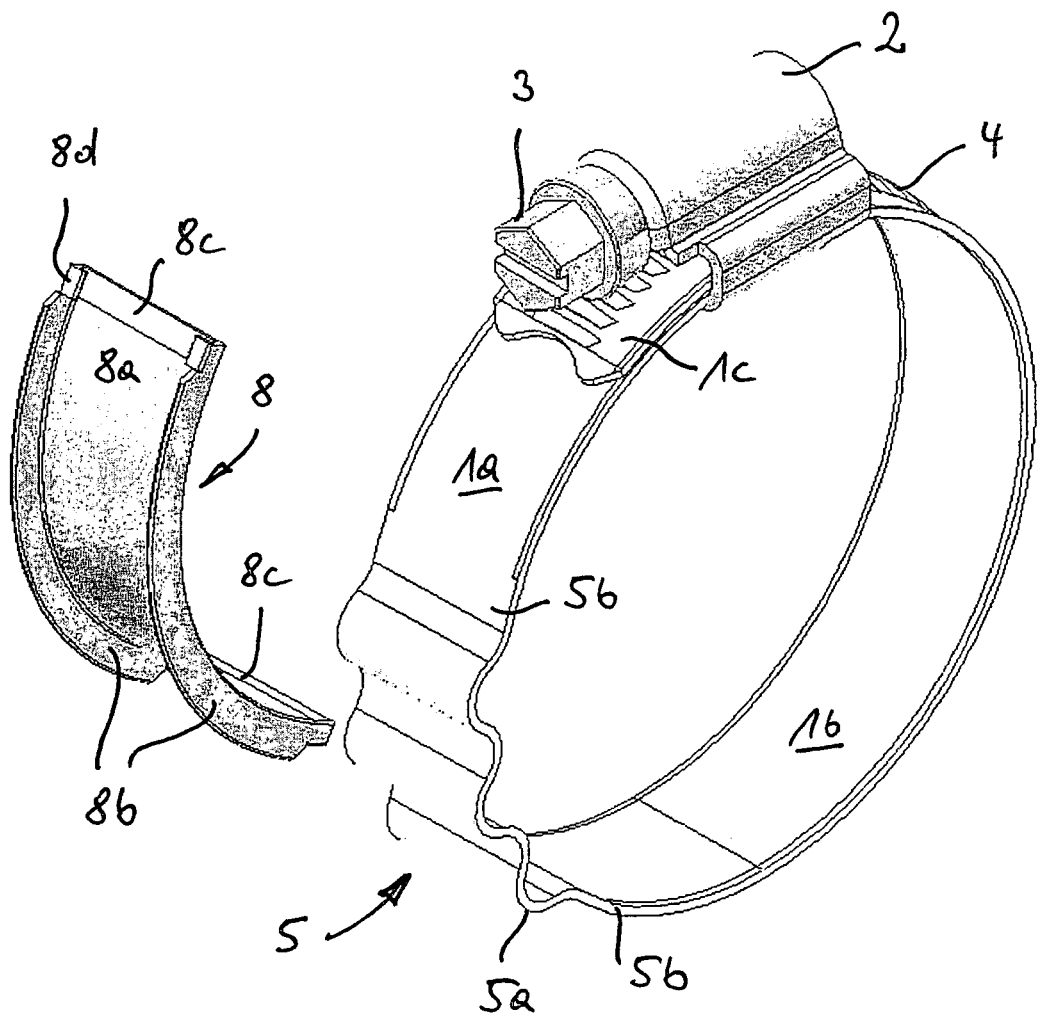
FIG. 4: An assembled hose clamp having a spring element unitarily formed with the strap.
Figure 5A:
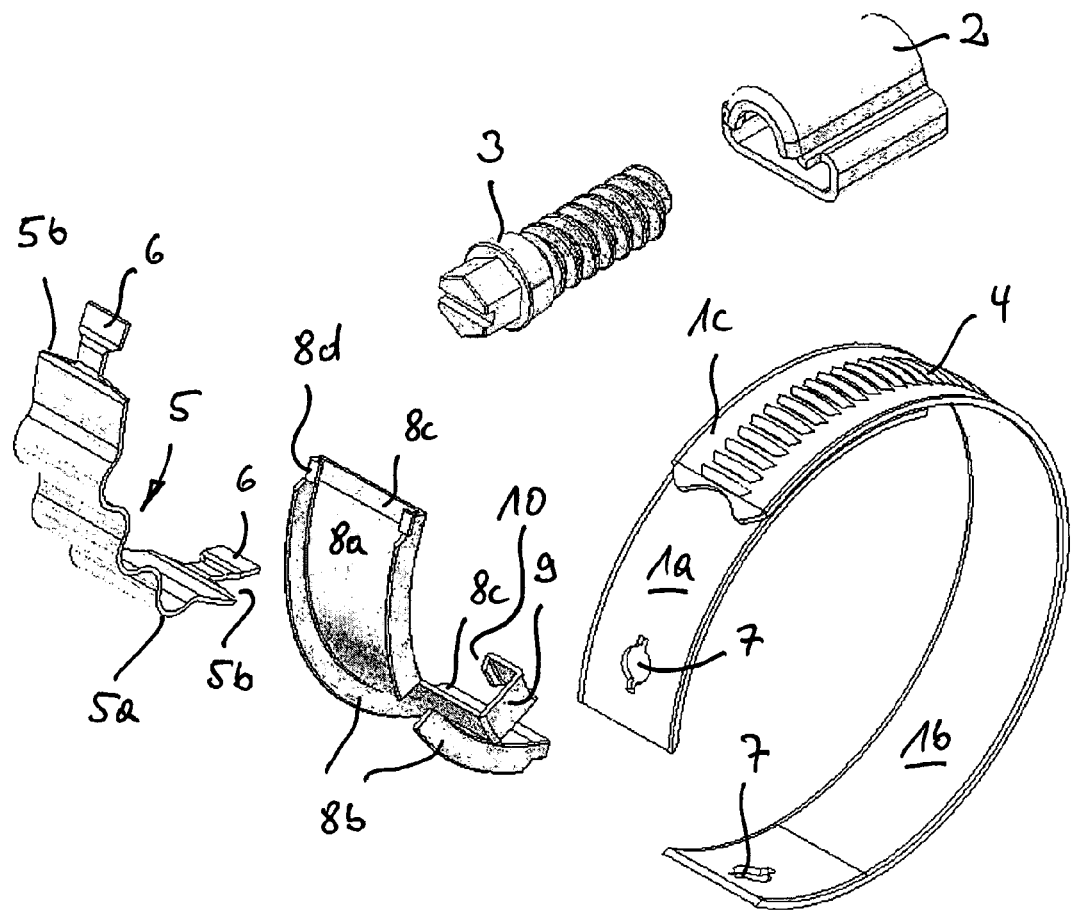
FIG. 5A: An exploded view of a hose clamp according FIGS. 2A and 2B having an auxiliary element for facilitating prepositioning.
Figure 53:
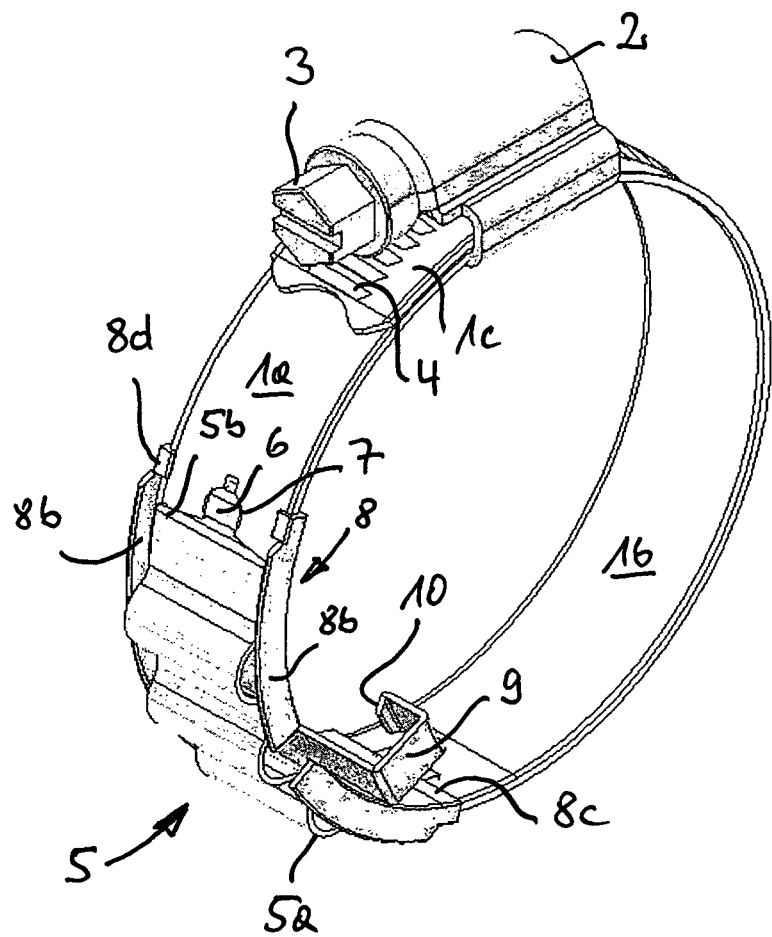

The FIGS. 5A and 5B furthermore show a clamp according to FIGS. 2A and 2B having in addition an auxiliary element 9 being formed in one piece with the guiding element 8. A part of the auxiliary element 9 extends in a direction perpendicular to the strap 1 and longitudinal to the hose (not shown). The end part of the auxiliary element 9 is bent three times. The free end of the auxiliary element 9 forms a stopping face 10 that may come into contact with the front face of the hose. By contacting the front face the distance between the front face and the hose clamp is defined.

Providing an auxiliary element 9 to the hose clamp is noz limited to the embodiment according FIG. 2. It may be provided with all embodiments shown or not shown.

In general by tightening the hose clamp the part 1b of strap 1, in particular its end 1c will be drawn into or through the housing 2. The effective length of the strap 1 becomes smaller and the spring element 5 gets stretched thus providing a biasing or compensating force. By tightening potential energy is stored in this spring element. This biasing force/stored energy may help to clamp a hose even when it deteriorates by aging. Furthermore the spring element 5 serves as a force limiter by getting stretched if the applied force is too high.

All the features mentioned with respect to a specific embodiments may not only be provided in this specific embodiment but in all the embodiment even when this is not expressively mentioned. All the features are part of the invention and may be combined in any relation to each other.

The invention claimed is:

1. A hose clamp comprising:
   a flexible strap fittable circumferentially partially around a hose and having a pair of opposite ends;
   a strap end part separate from the strap, forming a circumferential extension of the strap, and having one end overlapping one of the ends of the strap and another end spaced circumferentially from the other end of the strap, the other ends of the strap and of the strap end part each being formed with a throughgoing hole;
   a mechanism adjustably connecting the one end of the strap and the one end of the strap end part for increasing or reducing an effective total circumferential length of the strap and strap end part; and
   a spring element separate from the strap and strap end part and having ends each formed with a tab fittable through and lockable with the respective holes of the strap and the strap end part to form interengaging link formations that circumferentially connect the other end of the strap end part to the other end of the strap, and that form releasable hinge connections between the ends of the spring element and the other ends of the strap and strap end part, whereby the spring element provides, when the strap, strap end part, and spring are wrapped circumferentially around a hose, a spring force in the circumferential direction of the strap to tighten the clamp on the house.

2. The hose clamp according to claim 1 wherein the spring element is corrugated, undulated or, wavy and at least partially flexible and curved in accordance with a curvature of the strap.

3. The hose clamp according to claim 2, wherein the spring element is positioned outside an ideal curved line corresponding to a curvature of the strap.

4. The hose clamp according to claim 2, wherein a height or amplitude of the corrugations, undulations, or waves of the spring element decrease from a middle of the spring element to the ends of the spring element.

5. The hose clamp according to claim 1, further comprising:

a guide element in which the spring element is slidingly guided and that underlies the spring element from inside the hose clamp.

6. The hose clamp according to claim 5, wherein the guide element has a curvature corresponding to a curvature of the strap.

7. The hose clamp according to claim 5, wherein the guide element is fixed to the one end of the strap and slidingly linked to the one end of the strap end part.

8. The hose clamp according to claim 5, wherein the guide element is of U-section perpendicular to the circumferential extension of the strap and receives the spring element inside its cross section.

9. The hose clamp according to claim 1, further comprising:
    an auxiliary element for facilitating prepositioning of the hose clamp on a hose, the auxiliary element extending at least partly in a direction perpendicular to the strap and in a longitudinal extension of a hose surrounded by the strap.

10. The hose clamp according to claim 9, wherein the auxiliary element has a stop face contacting a front face of a hose and defining a spacing between the hose clamp and this front face.

11. The hose clamp according to claim 9, further comprising:
    a guide element in which the spring element is slidingly guided and that underlies the spring element from inside the hose clamp, the auxiliary element being formed in one piece with the guide element.

12. The hose clamp according to claim 1, wherein extra sealing force provided by the spring element is longitudinal of the strap such that it does not damage or concentrate the force applied by the strap and strap end part to the hose.

* * * * *